(12) United States Patent
de la Bruère-Terreault et al.

(10) Patent No.: US 8,337,630 B2
(45) Date of Patent: Dec. 25, 2012

(54) METHOD FOR CLEANING THE COMPRESSOR OF A GAS TURBINE ENGINE

(75) Inventors: Julien de la Bruère-Terreault, Ste-Anne-de-Sorel (CA); Andrew Robert Marshall, Grand Valley (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 13/551,964

(22) Filed: Jul. 18, 2012

(65) Prior Publication Data

US 2012/0279523 A1 Nov. 8, 2012

Related U.S. Application Data

(62) Division of application No. 12/389,894, filed on Feb. 20, 2009, now Pat. No. 8,245,952.

(51) Int. Cl.
*B08B 9/00* (2006.01)
*B08B 9/027* (2006.01)

(52) U.S. Cl. .............. 134/22.12; 134/22.1; 134/22.11; 134/24

(58) Field of Classification Search .............. None
See application file for complete search history.

(56) References Cited

U.S. PATENT DOCUMENTS

| | | | |
|---|---|---|---|
| 2,549,819 A | 4/1951 | Kane | |
| 2,775,864 A | 1/1957 | Karcher | |
| 3,623,668 A | 11/1971 | Freid et al. | |
| 3,778,170 A | 12/1973 | Howell et al. | |
| 4,011,017 A | 3/1977 | Feuerstein et al. | |
| 4,046,155 A * | 9/1977 | Mansson | 134/167 R |
| 4,792,276 A | 12/1988 | Krawiec et al. | |
| 4,815,276 A | 3/1989 | Hansel et al. | |
| 4,944,483 A * | 7/1990 | Nishizawa | 249/83 |
| 5,193,976 A | 3/1993 | Kolev et al. | |
| 5,195,209 A | 3/1993 | Watkins | |
| 5,311,639 A | 5/1994 | Boshier | |
| 5,385,014 A | 1/1995 | Rathbun | |
| 5,417,546 A | 5/1995 | Smith et al. | |
| 5,609,563 A | 3/1997 | Suzuki et al. | |
| 5,644,394 A | 7/1997 | Owens | |
| 5,679,174 A | 10/1997 | Buongiorno | |
| 5,868,860 A | 2/1999 | Asplund | |
| 5,938,402 A | 8/1999 | Bochud et al. | |
| 5,944,483 A | 8/1999 | Beck et al. | |
| 6,233,937 B1 | 5/2001 | Gray | |
| 6,394,108 B1 | 5/2002 | Butler | |
| 6,491,048 B1 | 12/2002 | Foster | |
| 6,503,334 B2 | 1/2003 | Ruiz et al. | |
| 6,553,768 B1 | 4/2003 | Trewin et al. | |
| 6,659,715 B2 | 12/2003 | Kuesters et al. | |
| 6,712,080 B1 | 3/2004 | Handschuh et al. | |
| 7,033,135 B2 | 4/2006 | Mortzheim et al. | |
| 7,065,955 B2 | 6/2006 | Reback et al. | |
| 7,373,781 B2 | 5/2008 | Reback et al. | |
| 2002/0090298 A1 | 7/2002 | Beeck et al. | |

* cited by examiner

*Primary Examiner* — Michael Kornakov
*Assistant Examiner* — Nicole Blan
(74) *Attorney, Agent, or Firm* — Norton Rose Canada LLP

(57) ABSTRACT

There is provided a method for cleaning the compressor of a gas turbine engine. The method comprises providing a fluid passage in the inlet case strut with a nozzle communicating with the fluid passage and the inlet gas path. The fluid passage has a fluid connector for connecting wash/rinse fluid under pressure to the fluid passage. The method further comprises motoring the gas turbine engine, and injecting, through the nozzle, the wash/rinse fluid into the inlet gas path to mix with an incoming flow of air and flow into compressor rotor blades of the compressor.

6 Claims, 2 Drawing Sheets

METHOD FOR CLEANING THE COMPRESSOR OF A GAS TURBINE ENGINE

CROSS-REFERENCE TO RELATED APPLICATIONS

The present application is a divisional application of U.S. patent application Ser. No. 12/389,894 filed on Feb. 20, 2009, now U.S. Pat. No. 8,245,952, the entire content of which is herein incorporated by reference.

TECHNICAL FIELD

The present application relates to a compressor wash nozzle which is integrated in an inlet case strut of a gas turbine engine.

BACKGROUND ART

During operation of an aircraft turbine engine a significant volume of air flow through the compressor. Such air, depending on the flight path where the aircraft is operating contains various types of materials such as dirt, corrosive particulates, dust, salt carried in air when flying over ocean bodies, etc. This results in deposits on the blades of the compressor and eventual build-up which has an effect on the performance of the aircraft engine. Accordingly, the compressor must be washed on a regular basis in order to dislodge these deposits. Typically, turbine engines are cleansed after 200 to 400 hours of operation, depending on the flight path of the aircraft.

Various devices are known to clean turbine engines by injecting cleansing solution and water into the compressor intake. One such device is known as a wash ring which is a complicated tubular array fitted in the engine and adapted to spray washing and rinsing fluid into the compressor. This requires installation which is a time-consuming process and adds to the cost of cleansing the compressor. These tubular wash rings are also susceptible to damage during handling and storage and therefore need to be stored in secured areas and inspected from time-to-time to make sure that they are in good working condition. The cleansing process of the compressor is made while the engine is motored with the starter but without ignition. After the spraying of cleansing washing solution and/or water is completed, the igniter is operated in order to dry the compressor and the combustion chamber.

SUMMARY

According a broad aspect of the application, there is provided a compressor wash nozzle arrangement for a gas turbine engine having an inlet case strut extending through an inlet gas path upstream of a compressor section of the gas turbine engine, the compressor wash nozzle arrangement comprising a fluid passage extending through the inlet case strut, a nozzle integrated to said inlet case strut and in fluid flow communication with said fluid passage and disposed for discharging a pressurized wash/rinse fluid into incoming air flowing through the inlet gas path, a fluid connector communicating with said fluid passage and positioned exteriorly of said inlet gas strut and adapted for connection with a source of pressurized wash/rinse fluid for injection through said nozzle into gases flowing though the inlet gas path in the direction of the compressor section.

According to a still further broad aspect, there is provided a method for cleaning the compressor of a gas turbine engine of the type having an inlet case strut extending transversally across an inlet gas path upstream of a compressor section of the engine, the method comprising: providing a fluid passage in the inlet case strut with a nozzle communicating with the fluid passage and the inlet gas path, the fluid passage having a fluid connector for connecting wash/rinse fluid under pressure to the fluid passage; motoring the gas turbine engine; and injecting, through the nozzle, the wash/rinse fluid into the inlet gas path to mix with an incoming flow of air and flow into compressor rotor blades of the compressor section.

BRIEF DESCRIPTION OF DRAWINGS

Reference is now made to the accompanying figures, in which.

DETAILED DESCRIPTION

Figure 1:
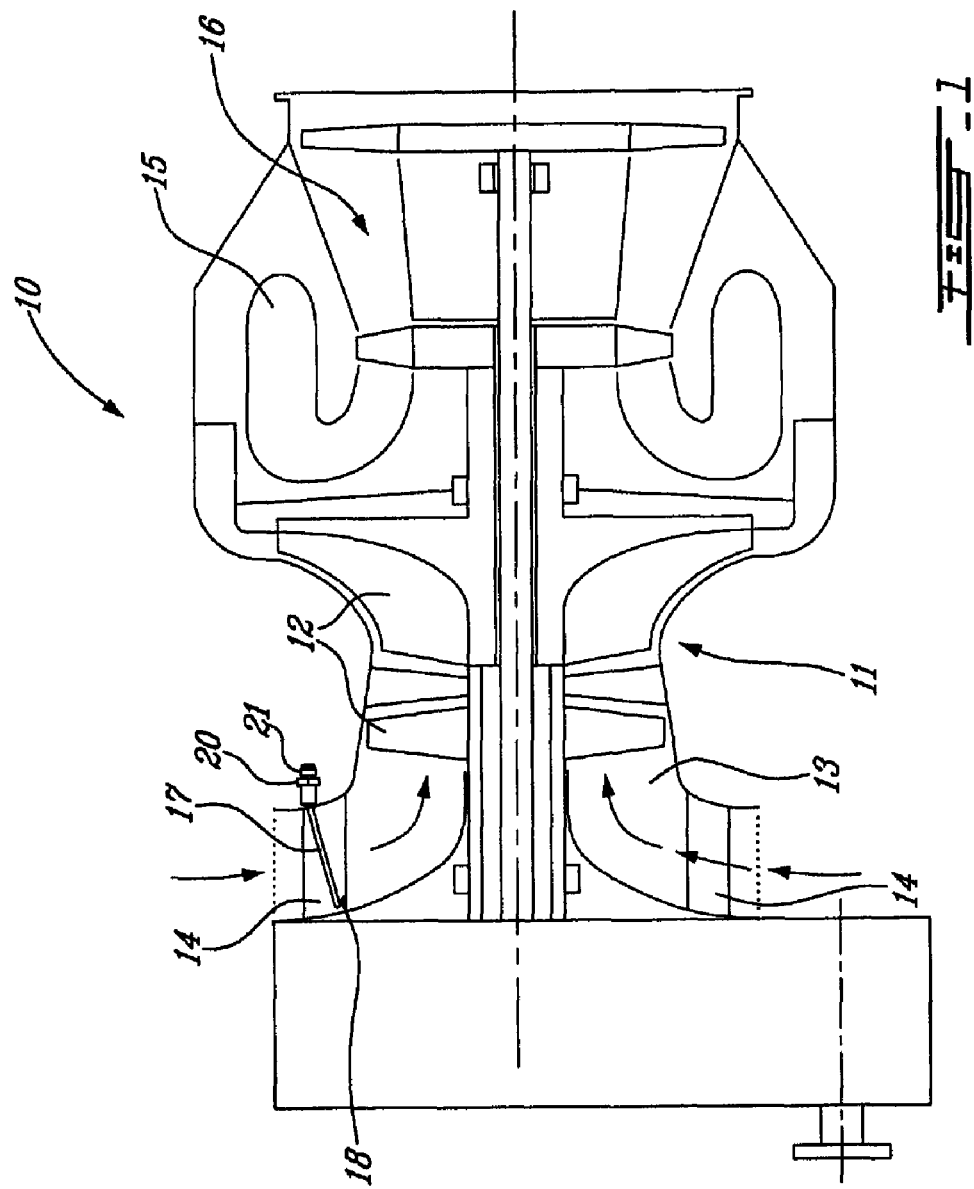
FIG. 1 is a schematic cross sectional view of a turboshaft engine, partly fragmented, to show the location of a compressor wash nozzle integrated in structural inlet case strut.

Referring to the drawings and more specifically to FIG. 1, there is shown a turboshaft gas turbine engine 10 generally comprising a compressor 11 having a compressor rotor 12. An inlet gas path 13 with a radially oriented air intake communicates with the compressor 11 to supply air thereto. A series of circumferentially distributed solid inlet case struts 14 extend through the inlet gas path 13 upstream of the compressor rotor 12. A combustor 15 receives the compressed air and mixes it with fuel which is ignited for generating an annular stream of hot combustion gases for the turbine section 16.

As will be seen hereinafter, a fluid passage 17 and a wash nozzle 18 are integrated to at least one of the inlet case struts 14 to inject washing and/or rinsing fluid under pressure into the inlet gas path 13 for washing the compressor 11 during servicing.

Figure 2:
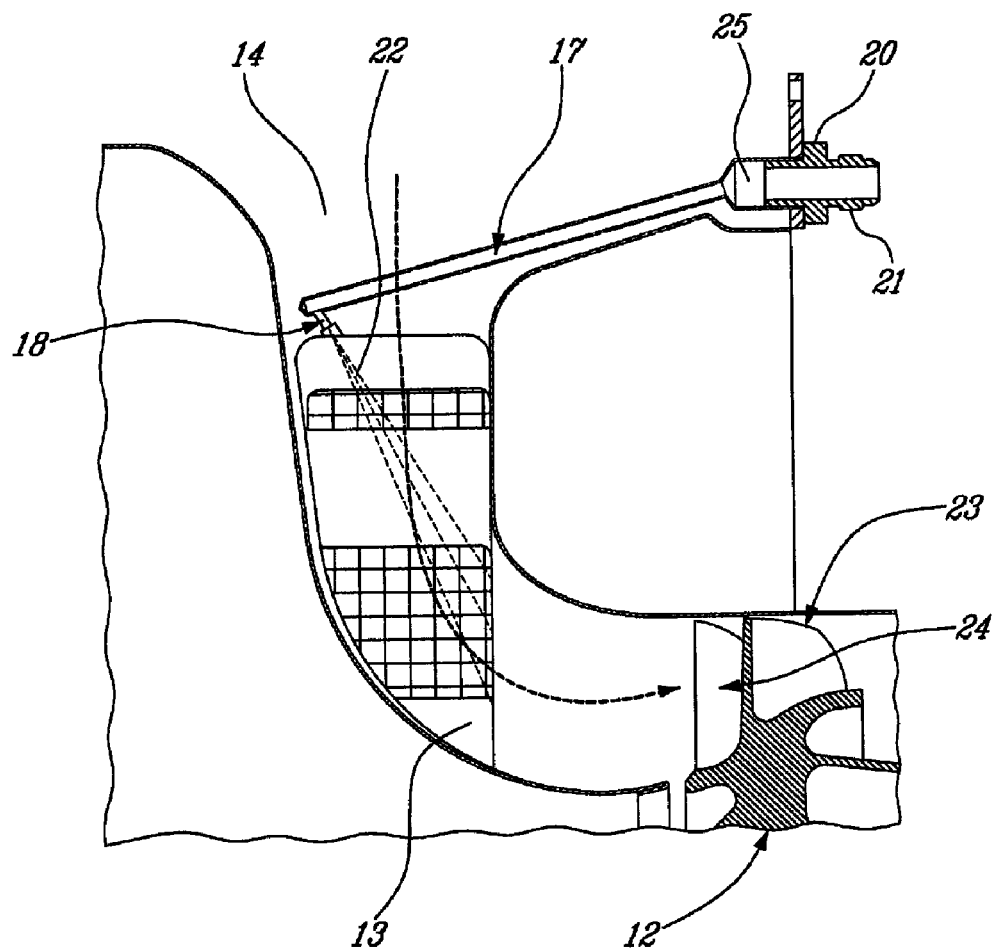
FIG. 2 is a section view through the inlet case strut showing the compressor wash fluid passage nozzle in relation to the inlet gas path of the compressor.

Referring now to FIG. 2, there is shown a section of an inlet case of the gas turbine engine 10 through one of the struts 14 of the inlet case. As hereinshown, the fluid passage 17 is machined within the body of the inlet case strut 14 and it has a nozzle 18 in communication therewith and disposed at a trailing edge of the inlet case strut 14, whereby to minimize the effects of aerodynamics at this trailing edge. A fluid connector 20 is secured to an enlarged inlet end 25 of the fluid passage 17 and is provided with a coupling 21 for quick connection and disconnection with a coupling of a fluid hose, not shown, connectable thereto. The fluid connector could also be permanently connected to an airframe mounted tube/hose to which the wash/rinse fluid supply system connects.

The coupling 21 is disposed outside of the inlet case on a rear side thereof so as to be accessible from outside of the gas turbine engine. The hose is, in turn, connected to a pressurized reservoir (not shown) containing a wash/rinse fluid under pressure for injection into the fluid passage 17 and out through the nozzle 18 where a spray of such wash/rinse fluid is injected into the gas path 13 as represented by spray cone 22. As herein shown the nozzle 18 is oriented to spray the wash/rinse fluid in the direction of the first stage 23 of the compressor rotor blades 24.

As shown in FIG. 2, the fluid passage 17 as well as the nozzle 18 can be drilled in the metal strut 14. If the strut 14 is of a hollow strut design, then the fluid passage 17 can be integrally cast within the hollow inlet strut. In such case, the coupling 25 and nozzle 18 could still be machined for precision reasons.

As can be appreciated, when it is necessary to wash the compressor 11, it is only necessary to attach the wash fluid hose to the fluid connector 20 provided with the quick coupling 21 at the rear of the inlet case (see FIG. 1). A valve may be provided in the fluid hose to communicate the fluid under pressure with the fluid passage 17 after the engine has been motored with the starter and without the ignition. On the other hand, if there is no valve in the fluid hose, then it can be secured to the quick coupling 21 after the engine has been motored whereby to inject the cleaning wash solution or the water rinse into the fluid passage for spraying into the inlet gas path 13 through the nozzle 18. As can be seen, the fluid passage 17 and nozzle 18 do not require the addition of material in order to clean the compressor 11 but to the contrary the method as herein-described is based on material removal from the inlet case strut 14, thus reducing weight. The design is therefore lighter as compared to conventional washing techniques such as wash rings or bolt-on nozzles which are secured to the engine. It also reduces cost due to handling, storage, maintenance and fabrication.

The above described strut integrated compressor wash nozzle design can be applied to any turbo shaft, turbo prop or turbo fan engine, either with radial or axial air inlet provided that its compressor is preceded by a solid or hollow strut and that it is possible to supply washing fluid to the nozzle through drilled or cast passages.

In summary, the method for cleaning the compressor of a turbine engine of the type having an inlet case strut extending through an inlet gas path upstream of the compressor, generally comprises providing a fluid passage in the inlet case strut with a nozzle communicating with the fluid passage and the inlet gas path. The fluid passage has a fluid connector for connecting wash/rinse fluid under pressure to the fluid passage. The turbine engine is motored and the wash/rinse fluid is injected, through the nozzle, into the inlet gas path to mix with the inlet gases and flow into the compressor rotor blades 12.

The integration of a compressor wash nozzle in an inlet case strut of a gas turbine engine simplifies the cleansing and/or washing of the compressor in that it does not require additional fixtures to be connected to spray wash/rinse fluid under pressure into the compressor. Also it does not require the storage of an additional cleansing unit.

The strut integrated compressor wash nozzle integration permits quick and easy connection of the washing and/or rinsing fluid under pressure for injection into the compressor.

The above description is meant to be exemplary only, and one skilled in the art will recognize that changes may be made to the embodiment described therein without departing from the scope of the invention disclosed. It is therefore within the ambit of present invention to cover any obvious modifications provided that these modifications fall within the scope of the appended claims.

What is claimed is:

1. A method for cleaning the compressor of a gas turbine engine of the type having an inlet case strut extending transversally across an inlet gas path upstream of a compressor section of the engine, the method comprising:
   i) providing a fluid passage in the inlet case strut with a nozzle communicating with the fluid passage and the inlet gas path, the fluid passage having a fluid connector for connecting wash/rinse fluid under pressure to the fluid passage;
   ii) motoring the gas turbine engine; and
   iii) injecting, through the nozzle, the wash/rinse fluid into the inlet gas path to mix with an incoming flow of air and flow into compressor rotor blades of the compressor section.

2. A method as claimed in claim 1, wherein the passage is formed by one of boring a conduit through a solid portion of the inlet case strut or integrally casting a conduit in the inlet case strut.

3. A method as claimed in claim 1, wherein prior to step (iii), there is provided the step of: connecting a hose from a pressurized wash/rinse fluid supply to the fluid connector.

4. A method as defined in claim 1, comprising connecting the fluid connector to a source of wash/rinse fluid from outside of the gas turbine engine.

5. A method as defined in claim 1, wherein step i) comprises integrating the nozzle in a trailing edge of the inlet case strut.

6. A method as defined in claim 1, wherein step iii) comprises spraying the wash/rinse fluid in the direction of a first stage of the compressor.

\* \* \* \* \*